United States Patent Office 3,644,606
Patented Feb. 22, 1972

3,644,606
PROCESS FOR THE MANUFACTURE OF
FOAM SLABS
Jacques Augé, André Guillaume, and Claude Tourniaire, Lyon, France, assignors to Rhone-Poulence S.A., Paris, France
Continuation of application Ser. No. 675,169, Oct. 13, 1967. This application Aug. 20, 1970, Ser. No. 65,690
Claims priority, application France, Oct. 18, 1966, 80,424
Int. Cl. B29d 27/04
U.S. Cl. 264—47                      5 Claims

ABSTRACT OF THE DISCLOSURE

Foam slabs are made by feeding a foamable liquid polyurethane mixture between two sheets which are brought together at an angle of less than 10°, sealing the edges of the sheets together, allowing the mixture to foam, and shaping the slab so obtained.

---

This is a continuation of application Ser. No. 675,169 filed Oct. 13, 1967.

The present invention relates to the continuous production of foam slabs, especially slabs of rigid polyurethane foams, and apparatus for use therein.

The continuous production of foam slabs is well known. Generally, the product to be expanded is run over a support sheet and an attempt is made to spread it out uniformly, the said support sheet being driven with a translational movement at constant speed. The product to be expanded is then covered by a sheet unwound at the same speed as the support sheet and parallel thereto. During the expansion, the assembly thus formed enters a shaping and conveying apparatus in which the shaping and polymerisation of the slabs take place, whereafter the said slabs can be cut and worked.

When the reactants employed are viscous and react rapidly, it is not possible to distribute them by means of a casting machine or through any elongated orifice. Therefore, in the known methods, the liquid reactant is generally deposited upon a sheet of great width with the aid of a device having a substantially circular casting orifice or with the aid of a spraying device having a transverse reciprocating movement in relation to the support sheet. The distribution thus obtained is not uniform, because, regardless of the precautions taken, it is difficult to avoid local unevenness, the extent of which increases as the product is more viscous and is deposited in smaller quantities over a larger width. Now, the least inequality in distribution of the liquid reactant is multiplied by the expansion coefficient of the foam, which may now be as high as 30 to 40. Attempts have therefore been made to improve the distribution of the product by passing it under a blade or between two rollers, the spacing of which is adjusted. However, these known devices do not successfully effect the rearrangement of the product in the form of a uniform film and they do not avoid the imprisonment of air, which results in local deficiencies of foam, or they produce banks of product. These banks create locally a continuous turbulent flow, produce lateral ripples, and retained the product for an indeterminate time. Therefore, after having been spread, even with the aid of a cooled device, the foam starts to form irregularly. Now, it is found that the expansion first develops perpendicularly to the support sheet so as to occupy the whole available height and only thereafter laterally to fill the remaining voids, more particularly along the edges. Thus, the slabs obtained by the known processes are not homogeneous because they are formed of a foam which does not have the same structure, nor therefore the same properties, at all points, and more especially along the edges. This may sometimes involve a subsequent surfacing operation. For all these reasons, the spreading effected is not satisfactory. In addition, in these processes, if the expanding foam is not effectively contained, it may escape outside the support sheets, the more readily so as it forms irregular ripples. Attempts have been made to avoid this disadvantage by sticking the edges of the sheets, but the foam is compressed at the ripples and the evacuation of the air between two successive ripples is impeded, while in addition the edges of the slabs obtained by these methods are not uniform.

It has now been found that the slabs which exhibit the best characteristics (such as high mechanical compressive and bending strength and strong adhesion of the sheets to the expanded foam, with a given density) are obtained by a uniform expansion produced perpendicularly to the support sheet from a completely regular liquid layer.

The present invention provides a process, and a machine for carrying it out, whereby it is possible to produce from liquid mixtures which may be of high viscosity and react rapidly, slabs of any width in which the expansion is uniformly effected throughout and is directed perpendicularly to the support, and which thus have improved mechanical characteristics and improved homogeneity, and do not require any subsequent surface levelling.

The new process for the continuous production of slabs of expanded material from a liquid mixture capable of giving a foam, comprises running the liquid mixture onto a sheet driven at a constant speed, from one or more fixed distributors, immediately covering the liquid mixture with another sheet driven at the same speed, assembling the edges of the two sheets in fluid-tight manner, and simultaneously moving the sheets towards one another at an angle of less than 10° up to a calibrated separation and then maintaining them at this separation in order to distribute the liquid mixtures very gradually until it forms a single sheet of uniform height and of predetermined width which extends in a distance from the bonded edges which is proportional to the thickness of the desired slab, maintaining the mixture in an expansion zone under predetermined temperature conditions, and controlling the cross-section of the slab at the end of the expansion by passing it into a shaping device.

The process and the machine will be described in detail with reference to the drawings, which illustrate a particular preferred embodiment of the invention.

FIG. 1 diagrammatically illustrates, but not to scale, a machine for carrying out the various phases of the new process.

Figure 4:
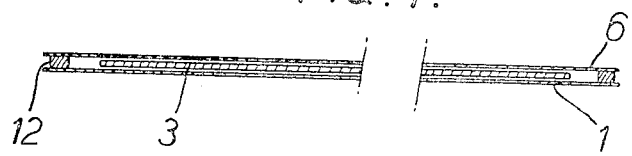
Figure 5:
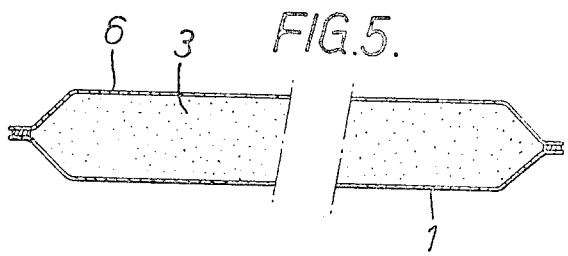
Figure 6:
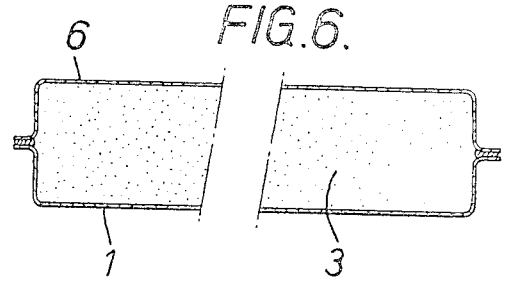
Figure 7:
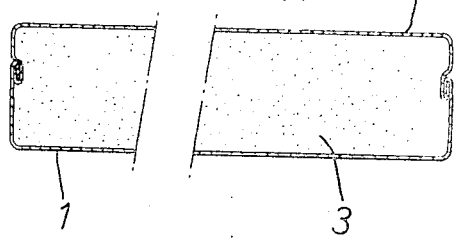

FIGS. 4, 5, 6 and 7 illustrate the successive phases of the production of a foam slab according to the invention. FIG. 4 illustrates in section the assembly formed by the liquid mixture after spreading between the support sheet and the covering sheet. FIG. 5 illustrates a section through this assembly at the beginning of the expansion. FIG. 6 illustrates a section through this assembly at the end of the expansion. FIG. 7 illustrates a section through the assembly after the final calibration.

Figure 1:
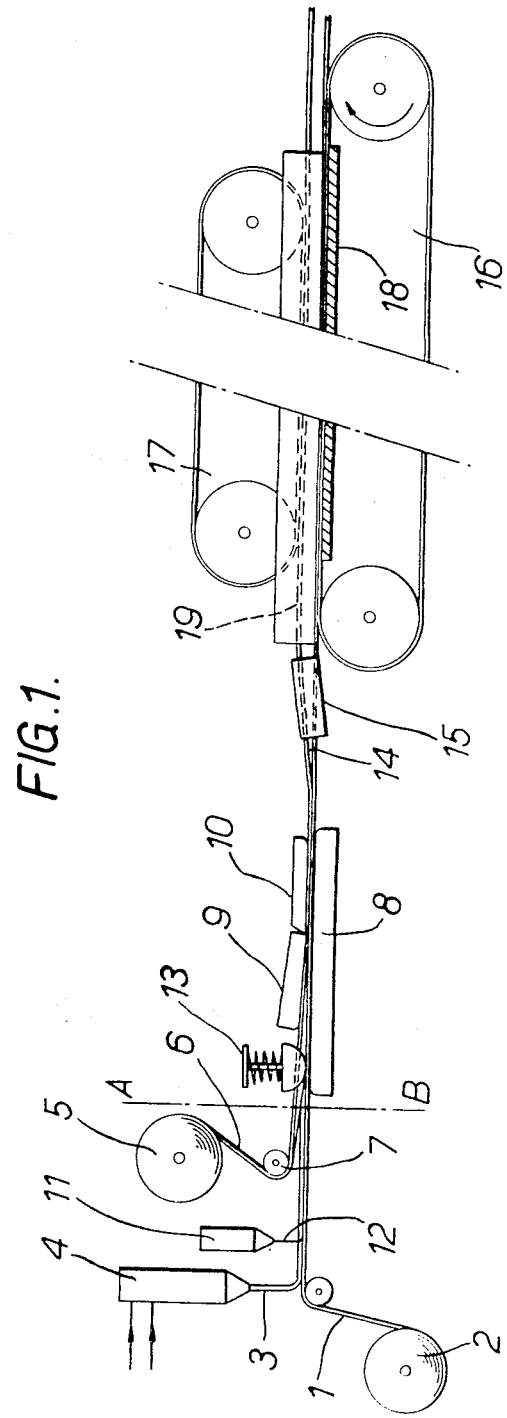
Figure 2:
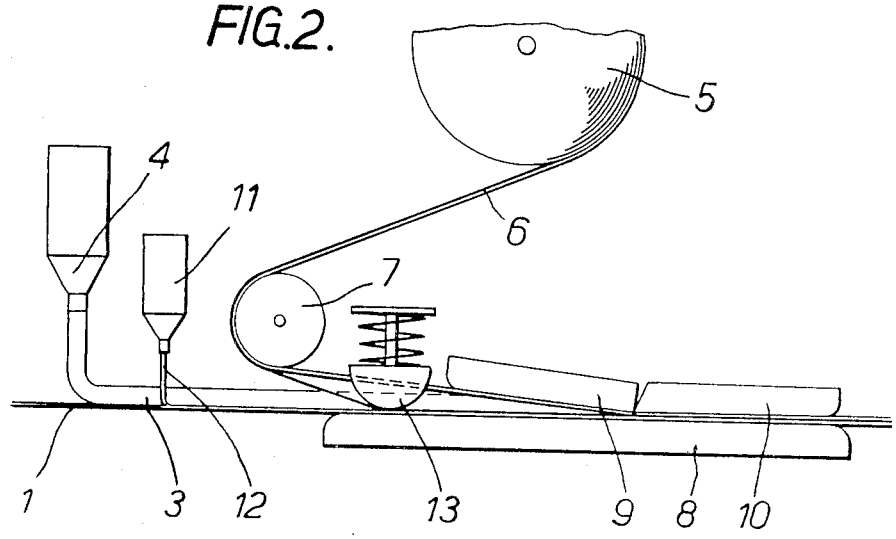
FIG. 2 illustrates in section a detail of the spreading device.

In the apparatus illustrated in FIG. 1, a sheet 1 is unwound horizontally from a roll 2, the said sheet serving as a support and when necessary as a final covering for the expanded foam slab. The mixture 3 to be expanded is run onto the said sheet in the liquid state by a known technique with the aid of one or more fixed casting heads 4. The rate of flow from the casting heads may be adjusted as required by adjusting in predetermined proportions the rates of flow of the various components of the mixture, the temperature of which are controlled and maintained constant. A roll 5 supplies a sheet 6 which passes over a guide roller 7 and immediately covers the liquid mixture. The sheets 1 and 6 are pulled between two smooth convergent fixed surfaces of appropriate profiles, for example plane. The lower surface 8 may be horizontal or slightly inclined, and the upper surface 9 is at first slightly inclined in relation thereto and then preferably parallel thereto over a short distance 10 (see FIG. 2). The angle between the convergent surfaces is set to a value below 10° and preferably below 5°. This angle is smaller in proportion as the spreading takes place over a larger width and as the viscosity of the mixture is higher. The distance between the convergent surfaces and the parallel surfaces is adjusted as a function of the desired thickness of the slab and of the extent of expansion of the foam, this distance generally being between 2% and 10% of the thickness of the finished slab.

Figure 3:
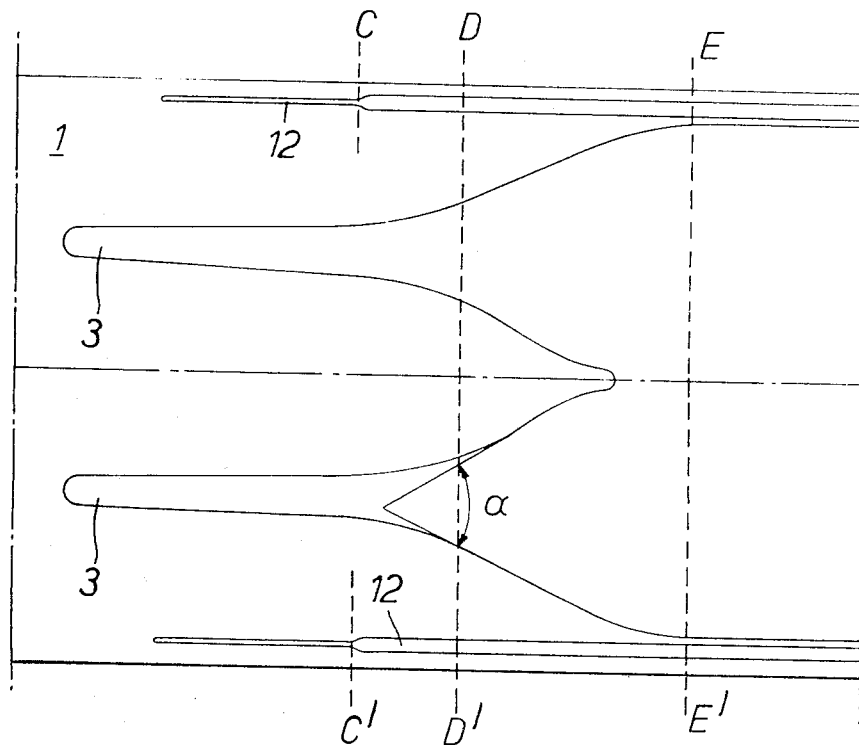
FIG. 3 illustrates in plan view the spreading of the product obtained by the apparatus.

FIG. 3 illustrates in plan view the spreading obtained between the plates 8, 9 and 10 of the product cast at 3 and 3' from two fixed casting heads, onto the support sheet 1 driven from left to right, the sheet 6 not being shown. The sheets, which are pulled between the two convergent surfaces, move towards one another and cause the liquid streams deposited between them to spread out very gradually on either side of their axis, between the lines DD' and EE', until they form a liquid layer of predetermined constant width and of uniform thickness, which is calibrated to the desired value. The lateral edges of the liquid layer are very regular at all times and exhibit no ripples. The liquid sheets form in spreading out an angle $\alpha$ which is smaller in proportion as the convergent plates form a smaller angle. The spreading is terminated when the whole assembly leaves the plate 9. It is maintained for a few instants between two parallel or substantially parallel surfaces to maintain the uniformity and the calibration obtained. Exact calibration is essential to permit expansion perpendicular to the support which is identical at all points and thus to avoid subsequent lateral displacement during the travel to the shaping device, which would be prejudicial to the quality and the homogeneity of the slab. Experience has shown that, to avoid unnecessary lengthening of the spreading and especially to effect a very gradual spreading, the angle $\alpha$ must be between 30° and 140° and preferably between 60° and 100°. The angle $\alpha$ is adjusted by appropriately adjusting the convergence of the plates 8 and 9.

Simultaneously, a thin stream 12 of very rapidly setting adhesive is run on either side of the support sheet 1 with the aid of two distributors 11, at a point slightly downstream of the point at which the product is cast. A buffer 13 presses the sheet 6 against the sheet 1 in the path of each stream of adhesive, at CC', in order to form a completely fluid-tight hem (see FIG. 4) which is necessary for laterally containing the expansion and avoiding any loss of product and any cleaning. The adhesive bonding of the edges of the sheet set up stresses which locally oppose the uniform expansion of the foam and which lead to slabs of oval cross-section. A uniform expansion perpendicular to the support sheet and a slab of substantially rectangular cross-section, can, however, be obtained if each stream of adhesive is run at a distance from the spread liquid mixture depending upon the thickness of the desired slab. A distance between one-quarter and one-half of the thickness of the finished slab is generally satisfactory. Those portions of the sheet which are situated between the adhesive and the spread liquid constitute at the beginning of the expansion of hem of regularly decreasing cross-section which enables the air to escape and constitutes after the expansion the side of the slab. This is possible only owing to the very regular spreading of the liquid layer, the edges of which occupy a well-defined position.

After the calibration and the bonding of the elements of the hem, there commences the phase 14 of appreciable expansion which occurs under the effect of the chemical reaction initiated after the mixing of the components in the casting head. This operation may, where necessary, be promoted by a temperature increase which is controlled and produced by any known heating means.

At the beginning of the expansion (see FIG. 5), the sheet 6, which has been lifted by the foam being formed, raises the edges of the sheet 1 which are stuck thereto, and the latter contain the lateral expansion. Under the effect of the continuing expansion and of an external lateral thrust, the sides can be vertically trued and the plate is then brought to its final width (see FIG. 6). This lateral thrust may be obtained by introducing the hem during the expansion into the interior of any shaping device of known type, for example consisting of two lateral fixed slideways 15 of appropriate profile. These slideways may in addition bend over the edges of the hem along the sides before it enters a conveyor 16. Thus, at all points of the slab, including the edges, the expansion proceeds substantially uniformly and perpendicularly to the support sheet without the structure of the foam having been substantially modified by any slight lateral displacements which may have occurred along the edges in the course of the expansion.

The conveyor 16 comprises in known manner, for example, wo parallel, horizontal, travelling endless flexible bands 17 sliding over support surfaces 18, and driven at a constant speed, and also two endless travelling, lateral, parallel and vertical bands 19. The distance between the two sets of parallel bands is gauged over the entire length. At the end of the expansion, the slab comes into contact with the horizontal and vertical bands and is thus carried along at the same speed, shaped and calibrated to the desired dimensions (see FIG. 7). The slab is thus conveyed and maintained at the calibre between the two sets of bands during the polymerisation, until the foam has been hardened sufficiently to prevent any danger of deformation thereof during the cutting or subsequent manipulations after they leave the conveyor.

The process according to the invention makes it possible to prepare slabs of polyurethane from an appropriate mixture of polyethers or polyesters possessing hydroxy groups, polyisocyanates, water, swelling agents, surface-active agents, and catalysts. It is also possible, without departing from the scope of the invention, to prepare flexible, semi-rigid or rigid slabs of plastic foam from usual foam-forming compositions.

The liquid reactant capable of giving a foam is distributed from distributors in fixed positions. From each distributor, the liquid reactant runs onto the support sheet and forms at a particular location a strip whose edges are substantially parallel or diverge slightly, are regular and have no ripples.

It is possible to employ only one distributor, for example if the reactant spreads very readily or if slabs of small width are being produced. However, since the spreading of the liquid takes place satisfactorily only over a limited width, it has been found that slabs of equal quality but of greater width may with advantage be obtained by juxtaposing a number of distributors and distributing them regularly in relation to the longitudinal plane of symmetry of the apparatus. It is then necessary to adjust the speed at which the sheets are pulled in order to obtain from each liquid strip contiguous spreading zones which exactly adjoin one another and ensure uniformity of the spread-out liquid layer.

The distributors may be of any known types, and preferably consist of casting heads. They are in fixed positions and are themselves preferably fixed; however, they may be subjected to vibrations or to small alternating movements of small amplitude, provided that the liquid mixture forms in a particular location a strip whose sides are parallel or diverge slightly, are regular and have no ripples.

The spreading of the liquid and its calibration are effected immediately after the casting, directly between the sheets which will constitute the faces of the slab by a mechanical assembly which guides them and moves them towards one another with precision. This mechanical assembly preferably consists of two appropriately profiled fixed surfaces which are optionally covered by an endless band. Other devices such as endless bands, or trains of rollers, may be employed.

The hem must be sealed in such manner as to be impervious to the spreading of the product at a distance from the spread product proportional to the thickness of the desired slab. The manner in which it is formed is adapted on the one hand to the materials employed for the support sheet and the covering sheet and on the other hand to the forces applied to these sheets owing to the expansion of the foam.

In order to form a hem two sheets may be employed which are assembled immediately after the casting of the liquid mixture, one sheet which is bent over on itself and is assembled along a single side after the casting of the liquid mixture, a number of appropriately assembled sheets, or two sheets assembled with the aid of strips. The sheets may be continuous or connected continuously and they may consist of paper, plastics, laminates or metal. They may be either flexible or rigid, or one may be flexible and the other rigid.

For sealing the hem, the system best adapted to the sheets employed is chosen; adhesive bonding in the case of a paper sheet, adhesive bonding, heat sealing, welding or crimping in the case of a flexible sheet; in any case, the assembly is so effected as to produce a fluid-tight hem by any known means such as those previously indicated.

Of course, the machine may comprise any device appropriate to the use of the desired elements of the hem and to their assembly, the adhesive bonding device shown in FIG. 1 being simply illustrative.

A process and a machine have been described by means of which the liquid to be expanded is deposited upon a support sheet which moves along a horizontal or substantially horizontal plane; but it is also possible to introduce the liquid to be expanded between the two sheets disposed on an inclined or substantially vertical plane. The calibration and the expansion may thereafter be effected along a horizontal or substantially horizontal plane, the devices illustrated in FIG. 1 and situated to the right of the line AB being in any case in this position.

The process according to the invention makes it possible to produce slabs which may be employed in transport, building, refrigeration for thermal and acoustic insulation, and for packing, in place of the traditional materials, by reason of their lightness, their robustness and their rotproofness.

The new process makes it possible, by reason of the uniform expansion of the liquid mixture in a direction perpendicular to the support sheet, to obtain slabs which are completely homogeneous as far as the edges, for a given density, and which have excellent mechanical bending and compressive strength and, if desired, excellent adhesion of the two sheets to the expanded foam. The rapid covering, the very gradual spreading and the uniform calibration of the product make it possible to avoid, during the expansion, any asymmetry between the lower and upper halves of the slab. The fluid-tightness of the hem makes it possible to avoid losses of foam and prevents it from overflowing onto the parts of the shaping apparatus. By means of the new process, slabs may be manufactured from mixtures of very varied compositions, and more particularly of very different viscosities. It is suitable for mixtures of high viscosity. More particularly, it is possible thereby to employ highly branched and therefore viscous polyols which generally give foams having better mechanical characteristics for a given density. The accurate calibration of the liquid mixture after spreading facilitates the production of slabs of small thickness and large width.

The following examples illustrate the invention.

EXAMPLE 1

An apparatus according to FIG. 1 is employed.

In a room whose temperature is between 22° and 24° C., a kraft paper support sheet of a width of 44 cm. is horizontally unwound at a speed of 4.9 metres per minute. With the aid of two fixed casting heads 20 cm. apart and symmetrically disposed in relation to the axis of the sheet, two liquid polyurethane streams are deposited on the sheet at a temperature of 22° C., at a rate of 900 g./min. per casting head. The streams consist of a mixture of:

(a) 100 parts by weight of self-extinguishing polyesters containing a surface-active agent sold under the name "Scurane M82P,"

25 parts by weight of monofluorotrichloromethane,
1.3 part by weight of N-methylmorpholine, and
0.05 part by weight of dibutyl-tin dilaurate; with (b) 100 parts by weight of polymethylene polyphenylisocyanate (isocyanate equivalent: 138) having a viscosity of 2.5 poises at 25° C. Mixture (a) has a viscosity of 30 poises at 20° C., a density of 1.34, and a hydroxyl number of 310.

A second kraft paper sheet of a width of 44 cm. is then unwound, which immediately covers the liquid polyurethane streams. The two sheets are pulled into the interior of the spreading device, which consists of a horizontal glass plate with a width of 45 cm. and a length of 60 cm., above which are disposed 2 contiguous glass plates, of the same width, having lengths of 30 and 20 cm. respectively, defining a space between the two sheets whose height decreases from 5 mm. to 0.6 mm. and then remains at this value. The two sheets are very gradually moved towards one another between these glass plates, so that each liquid stream is spread over a width of 20 cm. The sheets are pulled at a speed which is adjusted in such manner that each spreading zone is perfectly joined, and uniformity of the spread liquid layer is ensured. Simultaneously, two streams of very rapidly setting adhesive of "hot melt" type, spaced apart 42 cm., are continuously deposited on the support sheet from two distributors. After passage under the guide roller, the covering sheet comes into contact with the streams of adhesive deposited on the support sheet, on to which it is immediately pressed by a buffer, the fluid-tight hem being thus formed. The expansion begins and develops uniformly from the liquid layer uniformly spread out by passage through a zone in which the temperature is maintained at 30° C. With the aid of two fixed slideways, the edges of the hem are brought together and are then raised and turned over on to the sides at the end of the expansion. The slab thus shaped enters a conveyor apparatus formed essentially of two horizontal rubber belts of a length of 6 and 9 metres respectively and two vertical rubber belts of a height of 6 cm. and a length of 7.5 metres, which contain the expansion and maintain the slab in shape. The slabs obtained have a constant cross-section of a width of 40 cm. and a uniform thickness of 20 mm. They have a homogeneous structure throughout, as far as the edges, so that, with a density equal to 0.045, they have the best possible resistance to compression and to bending, perfect symmetry and very regular adhesion of the sheets to the expanded foam. They are cut to the desired length on leaving the apparatus. It is unnecessary to smooth the lower or upper faces.

EXAMPLE 2

A slab similar in all respects to that obtained in Example 1 is produced by the new process with the aid of an identical apparatus in which the spreading device between fixed plates is merely replaced by a device comprising sets of rollers. The sheets between which two liquid polyurethane streams have been run past successively between 5 sets of rollers having a diameter of 40 mm. Each set consists of two rollers whose axes are parallel and situated in a common vertical plane. The axes of the lower rollers are parallel and disposed at intervals in a horizontal plane over a distance of 20 cm. The thickness of the liquid film is successively brought to the following dimensions: 1.3 mm., 0.85 mm., 0.7 mm., 0.65 mm., and 0.6 mm. The other operations are thereafter carried out in exactly the same way as those described in Example 1 and the slabs obtained have the same properties.

EXAMPLE 3

An expanded polyurethane slab having the same composition is produced under the same conditions as in Example 1. The following modifications are made to the apparatus and the manner of performance. 3000 g./min. of liquid polyurethane are deposited with the aid of a single fixed casting head. The spreading device consists of flat plates of polished steel; it comprises a horizontal plate of a width of 60 cm. and of a length of 75 cm., above which are mounted two contiguous plates of the same width, having lengths of 45 and 30 cm. respectively, and defining a space between two sheets whose height decreases from 6.5 mm. to 1.6 mm. and thereafter remains at this dimension. The sheets are pulled at a speed of 3.90 m./min. The expansion is adjusted by passage over a bed whose temperature is maintained at 28° C. A slab of homogeneous structure and of constant cross-section is obtained, of a density of 0.044, a width of 40 cm. and a uniform thickness of 55 mm.

EXAMPLE 4

The apparatus described in Example 3 is employed, and the distance between the plates of the spreading device is adjusted from 8 mm. to 2.2 mm. 3000 g./min. of liquid polyurethane are deposited. The sheets are pulled at a speed of 2.80 m./min. A slab of homogeneous structure is obtained, which has a density of 0.042, a width of 40 cm. and a uniform thickness of 90 mm.

EXAMPLE 5

The apparatus described in Example 3 is employed, and the spacing between the plates of the spreading device is adjusted from 2.5 mm. to 0.35 mm. 830 g./min. of liquid polyurethane are deposited. The sheets are pulled at a speed of 3.20 m./min. A plate of homogeneous structure is obtained, which has a density of 0.055, a width of 35 cm. and a uniform thickness of 12 mm.

EXAMPLE 6

The operation is carried out under the same conditions as in Example 5, the composition of the polyurethane mixture merely being modified by adding 6 parts by weight of monofluorotrichloromethane. There is obtained a slab having a density of 0.035, the other characteristics being similar to those given in Example 5.

EXAMPLE 7

The operation is carried out under the same conditions as in Example 3, the two kraft paper sheets being replaced by aluminium sheets 0.04 mm. thick. The sheets are bonded together under the same conditions as the kraft paper.

EXAMPLE 8

The operation is carried out under the same conditions as in Example 3, the two sheets of kraft paper being replaced by two sheets of ethylene glycol polyterephthalate 58μ thick. The sheets are bonded together under the same conditions as the kraft paper.

What is claimed is:

1. In a process for the continuous production of slabs of expanded material consisting of a polyurethane foam obtained from a liquid mixture of a polyether or polyester containing hydroxyl groups, a polyisocyanate, a swelling agent and a catalyst, by running the said liquid mixture on to a sheet driven at a constant speed, immediately covering the said liquid mixture with another sheet driven at the same speed, controlling the thickness of the said liquid mixture between the said sheets, maintaining the mixture in an expansion zone under predetermined temperature conditions to foam the liquid mixture, and controlling the cross-section of the slab at the end of the expansion by passing it into a shaping device, the improvement which consists in running the said liquid mixture on to the said sheet from one or more fixed distributors, joining the edges of the two sheets in fluid-tight manner, and simultaneously moving the sheets towards one another at an angle of less than 10° up to a calibrated separation, and then maintaining them at this separation in order to distribute the liquid mixture very gradually until it forms a single sheet of uniform height and of predetermined width which extends to a distance from the joined edges which is proportional to the thickness of the desired slab.

2. The improvement according to claim 1 in which the sheets are made of a material selected from the class consisting of paper, metal, and plastic film.

3. The improvement according to claim 1 in which the foam is a rigid polyurethane foam.

4. The improvement according to claim 1 in which the said distance from the bonded edges is between one quarter and one half of the thickness of the finished slab.

5. The improvement according to claim 1 wherein the sheets are moved towards one another at an angle of 5° or less.

References Cited

UNITED STATES PATENTS

| | | | |
|---|---|---|---|
| 2,956,310 | 10/1960 | Roop | 156—79 X |
| 3,231,439 | 1/1966 | Voelker | 264—47 X |
| 3,118,800 | 1/1964 | Snelling | 264—47 X |
| 3,166,831 | 1/1965 | Keith | 156—79 |
| 3,240,846 | 3/1966 | Voelker | 264—47 |
| 3,429,956 | 2/1969 | Porter | 264—47 |
| 3,562,767 | 2/1971 | Mallet | 18—4 B |

PAUL A. LEIPOLD, Primary Examiner

U.S. Cl. X.R.

18—4 B, 5 F; 156—79; 264—45, 54